(12) United States Patent
Iyengar

(10) Patent No.: US 11,323,379 B2
(45) Date of Patent: May 3, 2022

(54) ADAPTIVE MONITORING OF COMPUTING SYSTEMS

(71) Applicant: International Business Machines Corporation, Armonk, NY (US)

(72) Inventor: Arun Iyengar, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 146 days.

(21) Appl. No.: 16/152,573

(22) Filed: Oct. 5, 2018

(65) Prior Publication Data
US 2020/0112513 A1 Apr. 9, 2020

(51) Int. Cl.
*H04L 12/855* (2013.01)
*H04L 12/26* (2006.01)
*H04L 47/2466* (2022.01)
*H04L 43/16* (2022.01)
*H04L 43/10* (2022.01)

(52) U.S. Cl.
CPC ......... *H04L 47/2466* (2013.01); *H04L 43/10* (2013.01); *H04L 43/16* (2013.01)

(58) Field of Classification Search
CPC ..... H04L 47/2466; H04L 43/10; H04L 43/16; G06F 9/522; G06F 11/3024; G06F 9/4881; G06F 11/3072; G06F 11/3404; G06F 11/3409; G06F 11/3476; G06F 11/3419
See application file for complete search history.

(56) References Cited

U.S. PATENT DOCUMENTS

| 5,899,991 | A | * | 5/1999 | Karch | G06F 21/55 707/694 |
|---|---|---|---|---|---|
| 8,412,808 | B2 | | 4/2013 | Carr et al. | |
| 9,558,095 | B2 | | 1/2017 | Yim et al. | |
| 2003/0131343 | A1 | | 7/2003 | French et al. | |
| 2003/0154186 | A1 | * | 8/2003 | Goodwin | G06N 5/00 |
| 2006/0190596 | A1 | * | 8/2006 | Horikawa | G06F 11/3466 709/224 |
| 2011/0087927 | A1 | * | 4/2011 | Arnold | G06F 11/366 714/38.1 |
| 2013/0064079 | A1 | * | 3/2013 | Zhang | H04L 43/026 370/230 |
| 2013/0283090 | A1 | * | 10/2013 | Bradley | G06F 11/0793 714/2 |
| 2015/0261524 | A1 | | 9/2015 | He et al. | |

(Continued)

FOREIGN PATENT DOCUMENTS

| WO | WO 01/80054 A1 | 1/2001 |
|---|---|---|
| WO | WO 2007/015922 A2 | 2/2007 |

OTHER PUBLICATIONS

CPU sampling settings, Sep. 9, 2016, YourKit, pp. 1-3. (Year: 2016).*

(Continued)

*Primary Examiner* — Muhammad Raza
(74) *Attorney, Agent, or Firm* — Peter Edwards, Esq.; McGinn I.P. Law Group, PLLC

(57) ABSTRACT

An adaptive monitoring method, system, and computer program product including an intelligent monitoring system which obtains at least one preference from a user, where the at least one preference includes at least one maximum monitoring overhead.

7 Claims, 4 Drawing Sheets

(56) References Cited

U.S. PATENT DOCUMENTS

2017/0085456 A1\* 3/2017 Whitner ............... H04L 43/103
2017/0212808 A1 7/2017 Iyengar et al.

OTHER PUBLICATIONS

Mel, et al. "The NIST Definition of Cloud Computing". Recommendations of the National Institute of Standards and Technology. Nov. 16, 2015.

Dongyun Jin, Patrick O'Neil Meredith, Choonghwan Lee, and Grigore Roşu, "JavaMOP: efficient parametric runtime monitoring framework," ICSE '12: Proceedings of the 34th International Conference on Software Engineering, pp. 1427-1430.

Liang Tang, Tao Li, Larisa Shwartz, Florian Pinel, and Genady Ya Grabarnik, "An integrated framework for optimizing automatic monitoring systems in large IT, infrastructures," KDD '13 Proceedings of the 19th ACM SIGKDD international conference on Knowledge discovery and data mining, pp. 1249-1257.

Philipp Ittershagen, Kim Grüttner, and Wolfgang Nebel, "A Task-Level Monitoring Framework for Multi-Processor Platforms," May 2016 SCOPES '16: Proceedings of the 19th International Workshop on Software and Compilers for Embedded Systems, pp. 145-155.

\* cited by examiner

ADAPTIVE MONITORING OF COMPUTING SYSTEMS

BACKGROUND

The present invention relates generally to efficient and accurate adaptive monitoring of computer systems.

Monitoring computer systems is important for understanding performance and behavior of the systems. Conventional systems do not provide enough capabilities to tailor the amount of monitoring based on monitoring overhead. Frequent monitoring can provide information that is more precise. However, if the monitoring is done too frequently, this can result in considerable overhead.

SUMMARY

This patent application discloses how to monitor computer systems to obtain sufficient information while avoiding too much monitoring, which can result in excess overhead that harms performance. Conventional tools fail to do this and are often not sufficient for determining detailed information about an application.

In an exemplary embodiment, the present invention can provide a system, the method including an intelligent monitoring system which obtains at least one preference from a user, where the at least one preference includes at least one maximum monitoring overhead. One or more other exemplary embodiments include a computer program product and a method.

In one exemplary embodiment, the present invention can provide the system where the at least one preference comprises one of a maximum central processing unit (CPU) usage, a maximum memory usage, a maximum I/O bandwidth, and a maximum network bandwidth.

In one exemplary embodiment, the present invention can provide the system where the at least one preference comprises an importance score correlated with an importance of monitoring.

In one exemplary embodiment, the present invention can provide the system where the at least one preference comprises an accuracy score correlated with a desired accuracy of monitoring.

In one exemplary embodiment, the present invention can provide the system where at least one preference is provided to the intelligent monitoring system and the intelligent monitoring system is used to monitor at least one computer program.

In one exemplary embodiment, the present invention can provide the system where a central processing unit (CPU) time is used to determine how frequently to asynchronously monitor at least one computer program.

In one exemplary embodiment, the present invention can provide the system where a wall clock time is used to determine how frequently to synchronously monitor at least one computer program.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
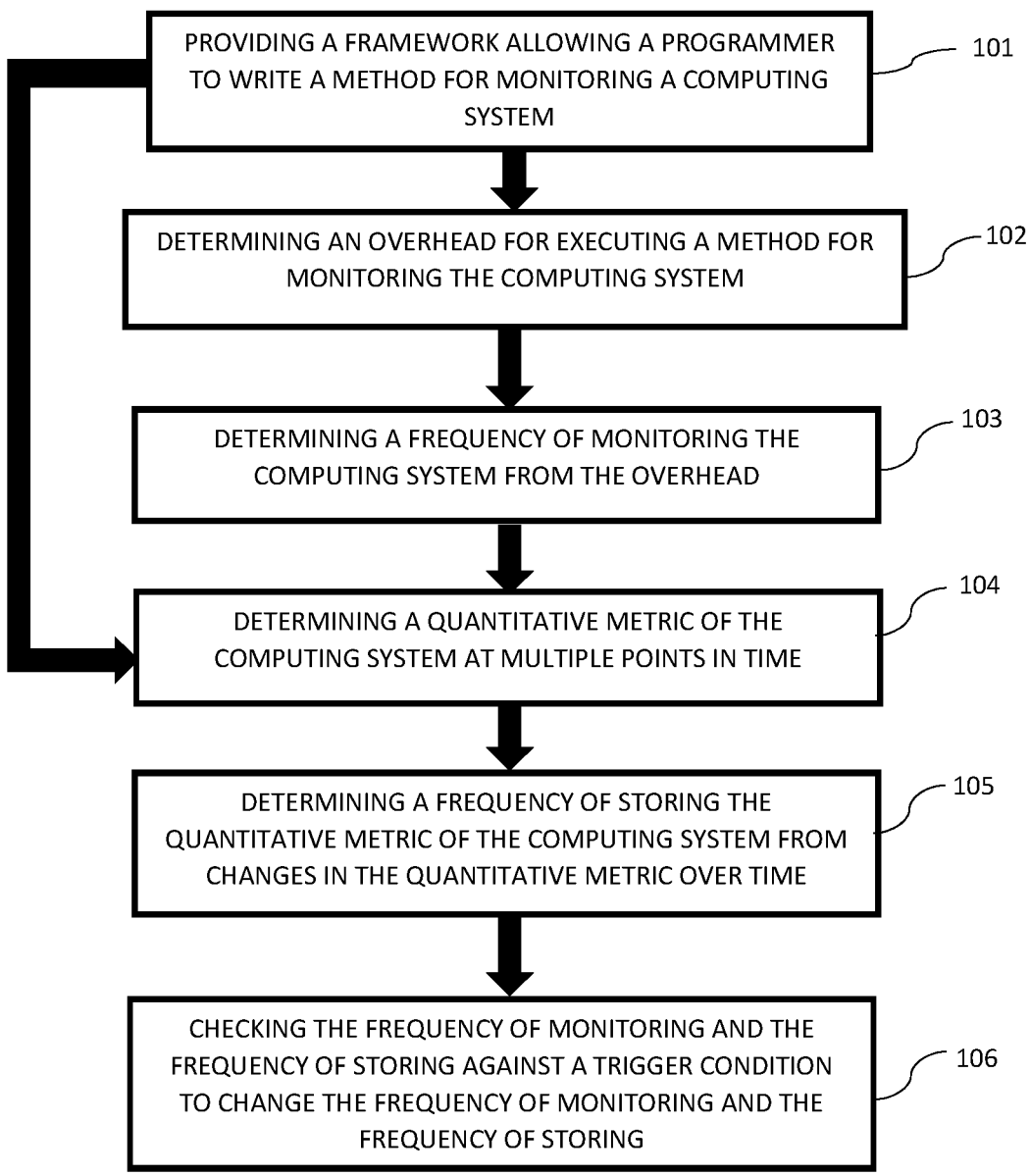
FIG. 1 exemplarily shows a high-level flow chart for an adaptive monitoring method 100 according to an embodiment of the present invention.

The invention will now be described with reference to FIGS. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

Monitoring of computer systems includes determining performance characteristics such as computer processing unit (CPU) usage, memory usage, network bandwidth, I/O bandwidth, time for a task or request to complete, etc. By way of introduction of the example depicted in FIG. 1 an embodiment of an adaptive monitoring method 100 according to the present invention can include various steps for allowing programmers to monitor computer systems and computer programs by invoking methods, functions, or procedures in a programming language. For example, a programmer writing an application in a programming language such as Java can invoke Java method calls to monitor a computing system, as well as the application itself. The monitoring code could be a standard monitor provided by the system to determine performance metrics such as CPU or memory utilization. Alternatively, the programmer can write customized monitoring code to monitor application-specific things, such as how much time is spent executing a specific part of a computer program/application.

That is, the invention disclosed herein can provide an intelligent monitor framework for monitoring applications at a language level for a specific programming language (e.g., Java, C++, C, etc.), for determining basic performance metrics such as CPU usage and memory while allowing the framework for programmers to define their own custom monitoring routines which are specific to an application.

Figure 2:
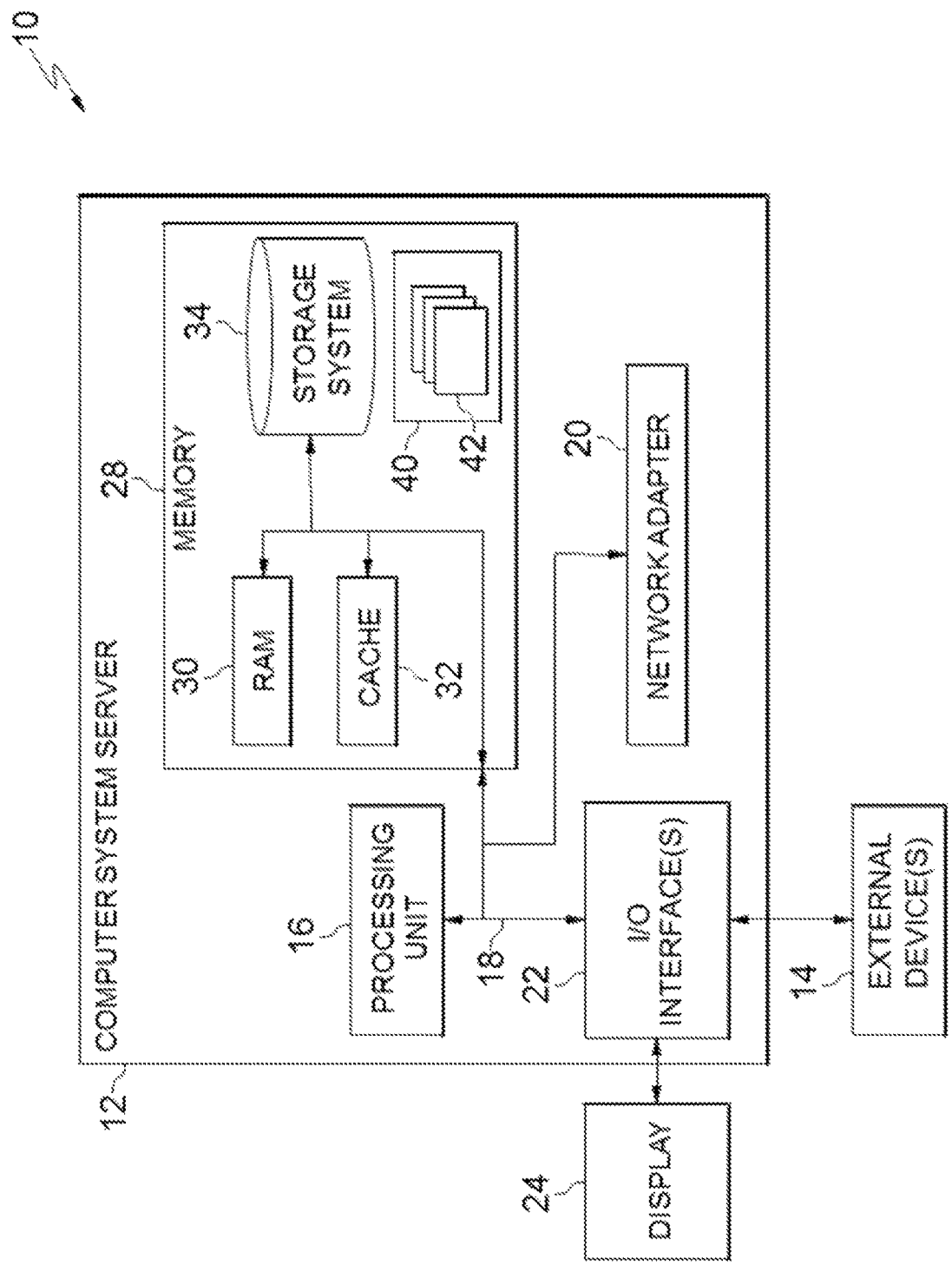
FIG. 2 depicts a cloud-computing node 10 according to an embodiment of the present invention.

By way of introduction of the example depicted in FIG. 2, one or more computers of a computer system 12 according to an embodiment of the present invention can include a memory 28 having instructions stored in a storage system to perform the steps of FIG. 1.

Referring now generally to the embodiments of the invention, monitoring can take place at several levels. For example, monitoring can take place at the computer system level, in which performance metrics are aggregated across several applications. Alternatively, monitoring can be at the level of a single application, where an application may be comprised of a computer program.

When a computer program is being monitored, the monitoring may take place synchronously or asynchronously. In synchronous monitoring, other parts of a computer program may block while the monitoring is taking place. The other parts of the computer program may resume after the monitoring phase has ended. In asynchronous monitoring, monitoring may take place concurrently while an application is running (e.g. in at least one concurrently executing process and/or thread). In some cases, a combination of synchronous and asynchronous monitoring will be taking place.

The disclosed intelligent monitoring system (IMS) can define trigger conditions which would indicate that corrective action should be taken. For example, a trigger condition could be that the time taken by a storage system exceeds a threshold. When the trigger condition is determined to occur, our intelligent monitoring system takes corrective action. The corrective action can be defined by a user. For example, in order to reduce the time taken by the storage system, more caching could be performed.

Monitoring can consume overhead. One exemplary aspect of the disclosed intelligent monitoring system is that it can limit monitoring to reduce overhead. It can reduce the frequency of monitoring to reduce overhead. Users have the ability to set upper bounds on monitoring overhead. For example, a user can indicate that a proportion of time spent monitoring should not exceed a threshold. The intelligent monitoring system (IMS) keeps track of monitoring overhead (e.g. CPU and wall clock time for monitoring, space consumed by data generated in monitoring, other similar overheads) and also can determine when to perform monitoring. The IMS controls the frequency of monitoring so that the time spent monitoring does not exceed thresholds specified by users. The IMS can also set the monitoring frequency to be high enough so that the monitoring overhead is close to a threshold but does not exceed the threshold.

The IMS can also over multiple monitors with different overheads. For example, a coarse-grained monitor might have low overhead but not as much accuracy as a fine-grained monitor with higher accuracy but higher overhead as well. The IMS can choose an appropriate monitoring method in order to properly balance performance and accuracy.

In order to further reduce data sizes, the IMS can perform data compression. Standard data compression techniques can be used. In addition, new data compression techniques are developed in which we only store a new data value if it differs from the previous one by an amount exceeding a threshold. One also can reduce data sizes by encoding a new data value as a difference from a previous value if this approach saves space. In some cases, space can be saved by encoding a new data value as a difference from a previous data value instead of storing the entire new value.

The IMS also provides multiple storage options for data that it collects. The data can be stored in memory; on disk, in a file system, in a cloud-based file system, relational database, and various other options.

One of the approaches the IMS uses to perform monitoring is the following. The IMS maintains data on the overhead of monitoring. This overhead may include, but is not limited, to one or more of the following: CPU time, wall clock time, space consumed by data, I/O bandwidth, network bandwidth. The IMS is constantly monitoring this overhead, as it may vary over time.

The IMS also monitors load on the system. This load may include, but is not limited to, one or more of the following: CPU usage, memory usage, I/O bandwidth being consumed, network bandwidth being consumed.

The user can also provide preferences to the IVIS for maximum monitoring overheads. These maximum monitoring overheads may include, but are not limited to, one or more of the following: CPU usage, memory usage, I/O bandwidth being consumed, network bandwidth being consumed. These maximum monitoring overheads indicate the maximum resources that should be consumed by monitoring. The user can also provide a monitor importance score, m. m indicates how important frequent monitoring is. A high value of m might indicate that frequent monitoring is important, while a lower score may indicate that frequent monitoring is less important.

The IMS uses this information to make intelligent choices for how frequently to monitor. If monitoring consumes relatively little overhead, then the IMS can perform more frequent monitoring (and/or choose a more accurate monitoring method). If, on the other hand, monitoring consumes a significant amount of overhead (such as CPU time), and the corresponding resource (the CPU, in this example) is overloaded, then the IMS can perform less frequent monitoring (and/or choose a monitoring method with less overhead). The same argument applies to other resources, such as memory.

The IMS also considers the monitor importance score, m. If m is high, then the IMS may perform more frequent monitoring (and/or choose a more accurate monitoring method), while if m is lower, then the IMS may perform less frequent monitoring (and/or choose a monitoring method with less overhead).

Another factor the IMS considers is how much change the IMS is observing in successive values produced by monitoring. If data d1 collected by monitoring at time t1 is very similar to data d2 collected at a later time t2 (for example, if a difference between d2 and d1 is less than a threshold), then it may make sense to set the monitoring interval to be larger than t2−t1. On the other hand, if there is a significant difference between d2 and d1 (for example, if a difference between d2 and d1 exceeds a threshold), then then it may make sense to set the monitoring interval to be smaller than t2−t1.

The IMS may make different decisions for synchronous monitoring compared with asynchronous monitoring. For synchronous monitoring, the wall clock time that it takes for a monitoring computation may be more important to consider than the CPU time the monitoring computation consumes in determining how frequently to perform monitoring (or which monitoring method to use). For asynchronous monitoring, the CPU time consumed by a monitoring computation may be more important to consider than the wall clock time the monitoring computation takes in determining how frequently to perform monitoring (or which monitoring method to use).

The IMS can also combine wall clock time and CPU time to assess monitoring overhead used to determine monitoring frequency. For example, the IMS can calculate an overhead associated with asynchronous monitoring which assigns a higher weight to CPU time than to wall clock time. For example, the overhead for an asynchronous monitoring computation could be determined by: $(a*(CPU\ time))+(b*(wall\ clock\ time))$, where $a>b$.

The IMS can also calculate an overhead associated with synchronous monitoring which assigns a lower weight to CPU time than to wall clock time. For example, the overhead for a synchronous monitoring computation could be determined by: (c*(CPU time))+(d*(wall clock time)), where c<d.

Many other types of equations can be used for calculating monitoring overhead from CPU and wall clock times. The above equations are Linear functions of CPU and wall clock time. It is also possible to calculate monitoring overhead from CPU and wall clock times using non-linear methods. The calculated monitoring overhead can be used to determine monitoring frequency. Lower monitoring overheads allow more frequent monitoring without compromising performance.

The IMS can reduce monitoring overhead by reducing a frequency of monitoring, and can increase monitoring accuracy by increasing a frequency of monitoring. In addition, as mentioned earlier, the IMS can offer multiple monitoring methods, wherein more accurate monitoring methods consume more overhead. The IMS can balance accuracy and performance by choosing a monitoring method based on its accuracy level and overhead consumed.

Users can also specify an accuracy level, "a", which is a number positively correlated with an accuracy of monitoring the user desires. If "a" is high, then the IMS may perform more frequent monitoring (and/or choose a more accurate monitoring method), while if "a" is lower, then the IMS may perform less frequent monitoring (and/or choose a monitoring method with less overhead).

Referring now to FIG. 1, in step 101, a framework is provided for allowing a programmer to write a method for monitoring the computing system (e.g., a framework is provided for editable coding to write a method for monitoring the computer system).

In step 102, an overhead is determined for executing a method for monitoring the computing system.

In step 103, a frequency of monitoring the computing system from the overhead is determined.

In step 104, a quantitative metric of the computing system is determined at multiple points in time. It is noted that step 104 can directly follow step 101 without performing steps 102 and 103.

In step 105, a frequency of storing the quantitative metric of the computing system from changes in the quantitative metric over time is determined.

In step 106, the frequency of the monitoring and the frequency of the storing are checked against a trigger condition to change the frequency of the monitoring and the frequency of the storing. An administrator can define a trigger condition(s), which would indicate corrective action, needs to be taken. For example, if a time taken by a storage system is too high, a trigger condition can be set to change the time (e.g., change the frequency). When a trigger condition occurs, a user-defined method is invoked to improve the situation. For example, in order to reduce time taken by storage system, increase amount of caching.

That is, steps 101-106 can provide a method for running an intelligent monitoring system which obtains at least one preference from a user, where the at least one preference includes at least one maximum monitoring overhead, on the computing system, providing at least one preference to the intelligent monitoring system, and using the intelligent monitoring system to monitor at least one computer program.

In one embodiment, the invention can provide a computer-implemented adaptive monitoring method, the method including providing a framework to write a method for monitoring a computing system, determining an overhead for monitoring the computing system, determining a frequency of monitoring the computing system for the overhead by setting an upper bound of the overhead, determining a quantitative metric of the computing system at multiple points in time, determining a frequency of storing the quantitative metric of the computing system in a storage from changes in the quantitative metric over time, checking the frequency of the monitoring and the frequency of the storing against a trigger condition to change the frequency of the monitoring and the frequency of the storing, and outputting a change condition for the computing system when the trigger condition occurs. The change condition can include limiting a time spend monitoring the overhead to prevent monitoring overhead from exceeding a threshold value to reduce a stress on the computing system and utilizing one of a standard data compression techniques and a data value compression to limit the amount of monitored data stored in the storage. The frequency of the monitoring and the frequency of the storing can include synchronous monitoring and asynchronous monitoring. Or, the frequency of the monitoring and the frequency of the storing include a combination of synchronous monitoring and asynchronous monitoring.

Exemplar Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set-top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive or flash drive (e.g., USB "thumb" drive), and an optical disk drive for reading from or writing to a removable, non-volatile optical disk such as a CD-ROM, DVD-ROM or other optical media can be provided. In such instances, each can be connected to bus 18 by one or more interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing device, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
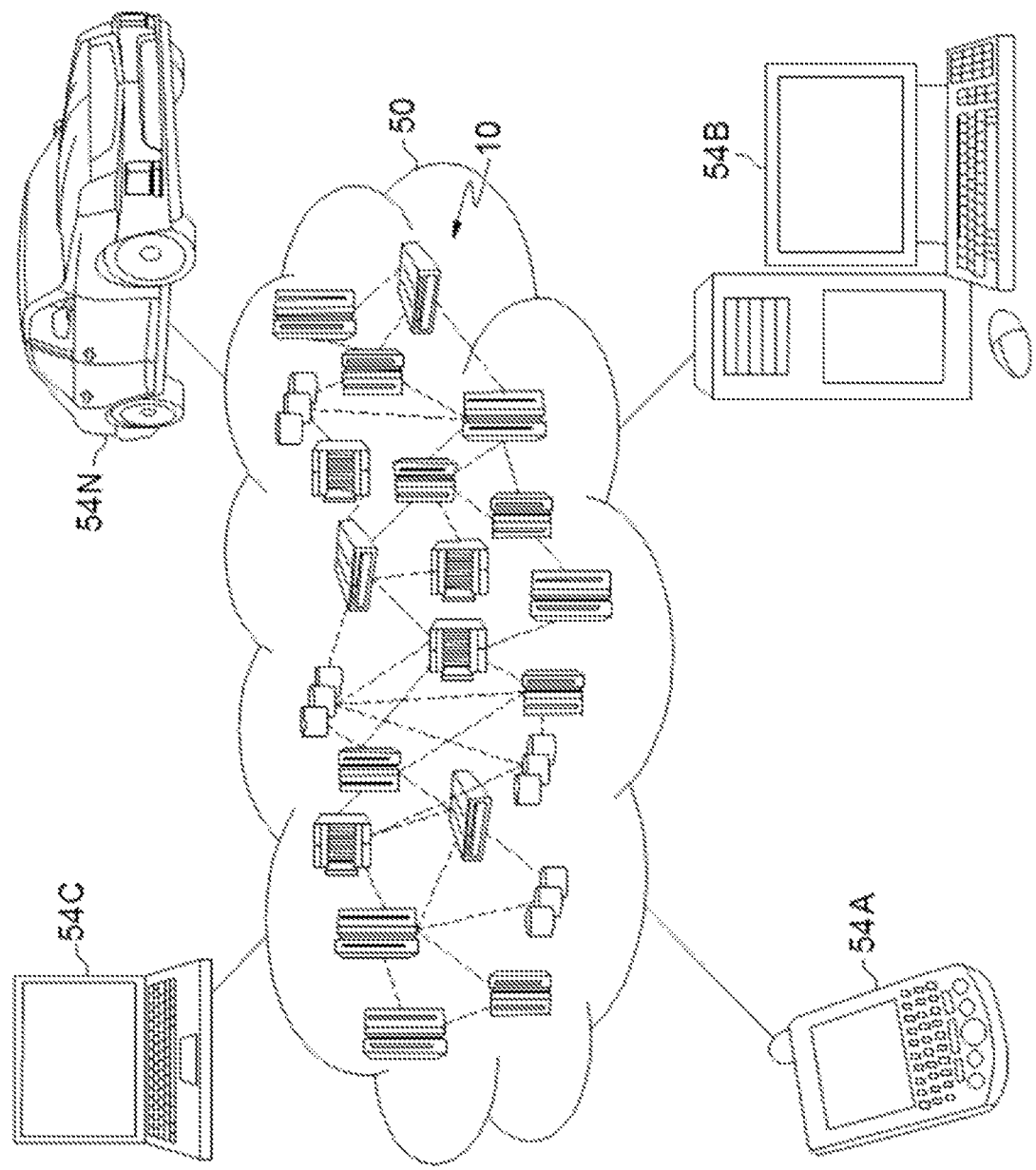
FIG. 3 depicts a cloud-computing environment 50 according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (FDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources attached to a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
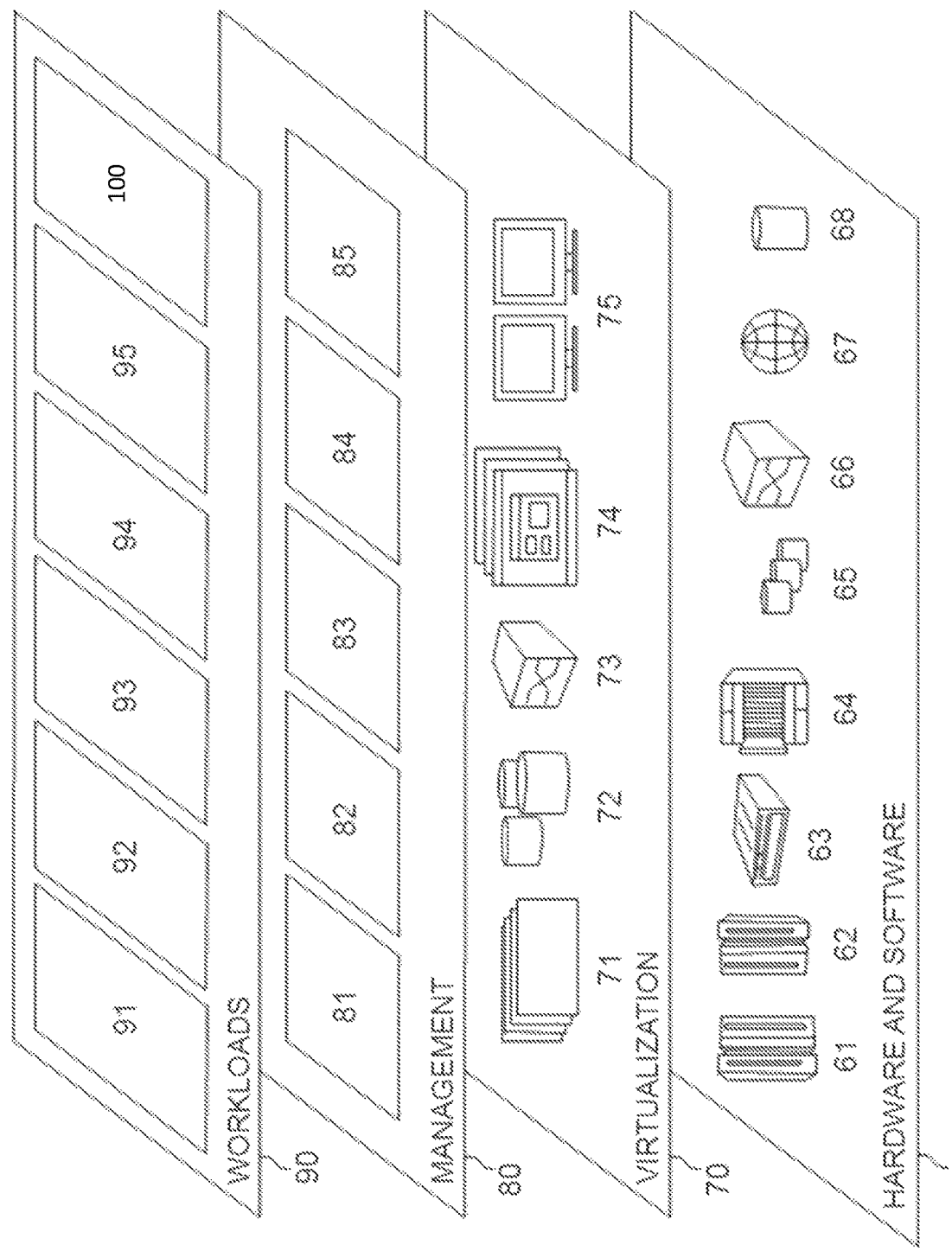
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions Which may be provided from this layer include: mapping and navigation 91; software development lifecycle management 92; virtual classroom education delivery 93; data analytics processing 94; transaction processing 95; and adaptive monitoring method 100 in accordance with the present invention.

The present invention may be embodied as a system, a method, and/or a computer program product at any reasonable level of integration with workloads layer 90, management layer 80, virtualization layer 70, hardware and software layer 60, and cloud computing environment 50. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, or procedural programming languages, such as the "C" programming language or similar programming languages. The computer readable program instructions may execute entirely on the user's computer, partly on the user's computer, as a stand-alone software package, partly on the user's computer and partly on a remote computer or entirely on the emote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market-place, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A system for monitoring at least one computer program executing on a computer system, the system comprising:
   a processor; and
   a memory, the memory storing instructions to cause the processor to execute:
      running an intelligent monitoring system which obtains at least one preference from a user, the at least one preference including at least one maximum monitoring overhead, on the computing system; and
      using the intelligent monitoring system to monitor the at least one computer program,
   wherein the maximum monitoring overhead comprises a threshold for an amount of overhead that can be consumed by the intelligent monitoring system for monitoring the computer program, further comprising assigning a different weight to a central processing unit (CPU) time than to a wall clock time to determine how frequently to monitor the at least one computer program, the weights being determined by: (a*(CPU time))+(b*(wall clock time)), where a is a CPU weight and b is a wall clock weight, wherein the CPU time comprises a CPU time consumed by the intelligent monitoring system for monitoring the at least one computer program, wherein the wall clock time comprises an actual time consumed by the intelligent monitoring system for monitoring the at least one computer program, and wherein a and b are positive numbers, wherein the at least one preference further comprises a maximum input/output (I/O) bandwidth, wherein the intelligent monitoring system keeps track of monitoring overhead and can determine when to perform monitoring, wherein the monitoring overhead comprises CPU time, wall clock time, I/O bandwidth, network bandwidth, and space consumed by data generated in monitoring, wherein the intelligent monitoring system controls the frequency of monitoring so that the time spent monitoring does not exceed the threshold specified by the user, wherein the CPU time is used to determine how frequently to asynchronously monitor at least one computer program, wherein in the asynchronously monitoring, monitoring takes place concurrently while the at least one computer program is running, and wherein the wall clock time is used to determine how frequently to synchronously monitor at least one computer program, wherein in the synchronous monitoring, blocking other parts of the at least one computer program while the monitoring takes place and resuming the other parts of the computer program after the monitoring phase has ended.

2. The system of claim 1, embodied in a cloud-computing environment.

3. A computer-implemented method for monitoring at least one computer program executing on a computer system, the method comprising:

running an intelligent monitoring system which obtains at least one preference from a user, the at least one preference including at least one maximum monitoring overhead, on the computing system; and using the intelligent monitoring system to monitor the at least one computer program, wherein the maximum monitoring overhead comprises a threshold for an amount of overhead that can be consumed by the intelligent monitoring system for monitoring the computer program, further comprising assigning a different weight to a central processing unit (CPU) time than to a wall clock time to determine how frequently to monitor the at least one computer program, the weights being determined by: (a*(CPU time))+(b*(wall clock time)), where a is a CPU weight and b is a wall clock weight, wherein the CPU time comprises a CPU time consumed by the intelligent monitoring system for monitoring the at least one computer program, wherein the wall clock time comprises an actual time consumed by the intelligent monitoring system for monitoring the at least one computer program, and wherein a and b are positive numbers, wherein the at least one preference further comprises a maximum input/output (I/O) bandwidth, wherein the intelligent monitoring system keeps track of monitoring overhead and can determine when to perform monitoring, wherein the monitoring overhead comprises CPU time, wall clock time, I/O bandwidth, network bandwidth, and space consumed by data generated in monitoring, wherein the intelligent monitoring system controls the frequency of monitoring so that the time spent monitoring does not exceed the threshold specified by the user, wherein the CPU time is used to determine how frequently to asynchronously monitor at least one computer program, wherein in the asynchronously monitoring, monitoring takes place concurrently while the at least one computer program is running, and wherein the wall clock time is used to determine how frequently to synchronously monitor at least one computer program, wherein in the synchronous monitoring, blocking other parts of the at least one computer program while the monitoring takes place and resuming the other parts of the computer program after the monitoring phase has ended.

4. The computer-implemented method of claim 3, embodied in a cloud-computing environment.

5. A computer program product for monitoring at least one computer program executing on a computer system, the computer program product comprising a computer-readable storage medium having program instructions embodied therewith, the program instructions executable by a computer to cause the computer to perform:

running an intelligent monitoring system which obtains at least one preference from a user, the at least one preference including at least one maximum monitoring overhead, on the computing system; and using the intelligent monitoring system to monitor the at least one computer program, wherein the maximum monitoring overhead comprises a threshold for an amount of overhead that can be consumed by the intelligent monitoring system for monitoring the computer program, further comprising assigning a different weight to a central processing unit (CPU) time than to a wall clock time to determine how frequently to monitor the at least one computer program, the weights being determined by: (a*(CPU time))+(b*(wall clock time)), where a is a CPU weight and b is a wall clock weight, wherein the CPU time comprises a CPU time consumed by the intelligent monitoring system for monitoring the at least one computer program, wherein the wall clock time comprises an actual time consumed by the intelligent monitoring system for monitoring the at least one computer program, and wherein a and b are positive numbers, wherein the at least one preference further comprises a maximum input/output (I/O) bandwidth, wherein the intelligent monitoring system keeps track of monitoring overhead and can determine when to perform monitoring, wherein the monitoring overhead comprises CPU time, wall clock time, I/O bandwidth, network bandwidth, and space consumed by data generated in monitoring, wherein the intelligent monitoring system controls the frequency of monitoring so that the time spent monitoring does not exceed the threshold specified by the user, wherein the CPU time is used to determine how frequently to asynchronously monitor at least one computer program, wherein in the asynchronously monitoring, monitoring takes place concurrently while the at least one computer program is running, and wherein the wall clock time is used to determine how frequently to synchronously monitor at least one computer program, wherein in the synchronous monitoring, blocking other parts of the at least one computer program while the monitoring takes place and resuming the other parts of the computer program after the monitoring phase has ended.

6. The computer program product of claim 5, further comprising assigning a higher weight to a central processing unit (CPU) time than to a wall clock time to determine how frequently to asynchronously monitor at least one computer program.

7. The computer program product of claim 5, further comprising assigning a higher weight to a wall clock time than to a central processing unit (CPU) time to determine how frequently to synchronously monitor at least one computer program.

\* \* \* \* \*